(12) United States Patent
Shum

(10) Patent No.: US 11,552,497 B1
(45) Date of Patent: Jan. 10, 2023

(54) USB RECHARGEABLE CHARGING CIRCUIT FOR PORTABLE POWER PACK WITH BOOST POWER AND PLURALITY OUTPUT SWITCH MODE SELECT OPTION

(71) Applicant: VECTOR PRODUCTS, INC., Boca Raton, FL (US)

(72) Inventor: Ling To Shum, Boca Raton, FL (US)

(73) Assignee: VECTOR PRODUCTS, INC., Boca Raton, FL (US)

( * ) Notice: Subject to any disclaimer, the term of this patent is extended or adjusted under 35 U.S.C. 154(b) by 0 days.

(21) Appl. No.: 17/178,968

(22) Filed: Feb. 18, 2021

Related U.S. Application Data

(60) Provisional application No. 62/978,568, filed on Feb. 19, 2020.

(51) Int. Cl.
*H02J 7/34* (2006.01)
*H02J 7/00* (2006.01)

(52) U.S. Cl.
CPC ............ *H02J 7/342* (2020.01); *H02J 7/0042* (2013.01); *H02J 7/0068* (2013.01)

(58) Field of Classification Search
CPC ...................................................... H02J 7/00
See application file for complete search history.

(56) References Cited

U.S. PATENT DOCUMENTS

| 2015/0171632 A1* | 6/2015 | Fry | H02B 1/26 |
| | | | 307/22 |
| 2017/0012448 A1* | 1/2017 | Miller | H02J 7/0031 |

\* cited by examiner

*Primary Examiner* — Robert Grant
(74) *Attorney, Agent, or Firm* — Daniel S. Polley, P.A.

(57) ABSTRACT

A sealed lead acid (SLA) battery jump starter system that charges and recharges via a single two-way USB, thus providing for a two-way power in/power out feature using a single USB port. The output is preferably provided with a 'triple voltage select' feature. In one non-limiting embodiment, the triple voltage select feature can allow for an output of either 5V, 12V or 20V. The system provides for higher power, a versatile design, and higher efficiency by integrating a USB charging circuit to recharge a lead acid battery in conjunction with drawing power from the lead acid battery to provide a preferred triple output switch mode selectable power. The system provides for a USB rechargeable charging circuit that can be capable of providing input low power to recharge lead acid batteries and also providing power out (preferably triple voltage and current choices) to recharge high output electronics.

15 Claims, 1 Drawing Sheet

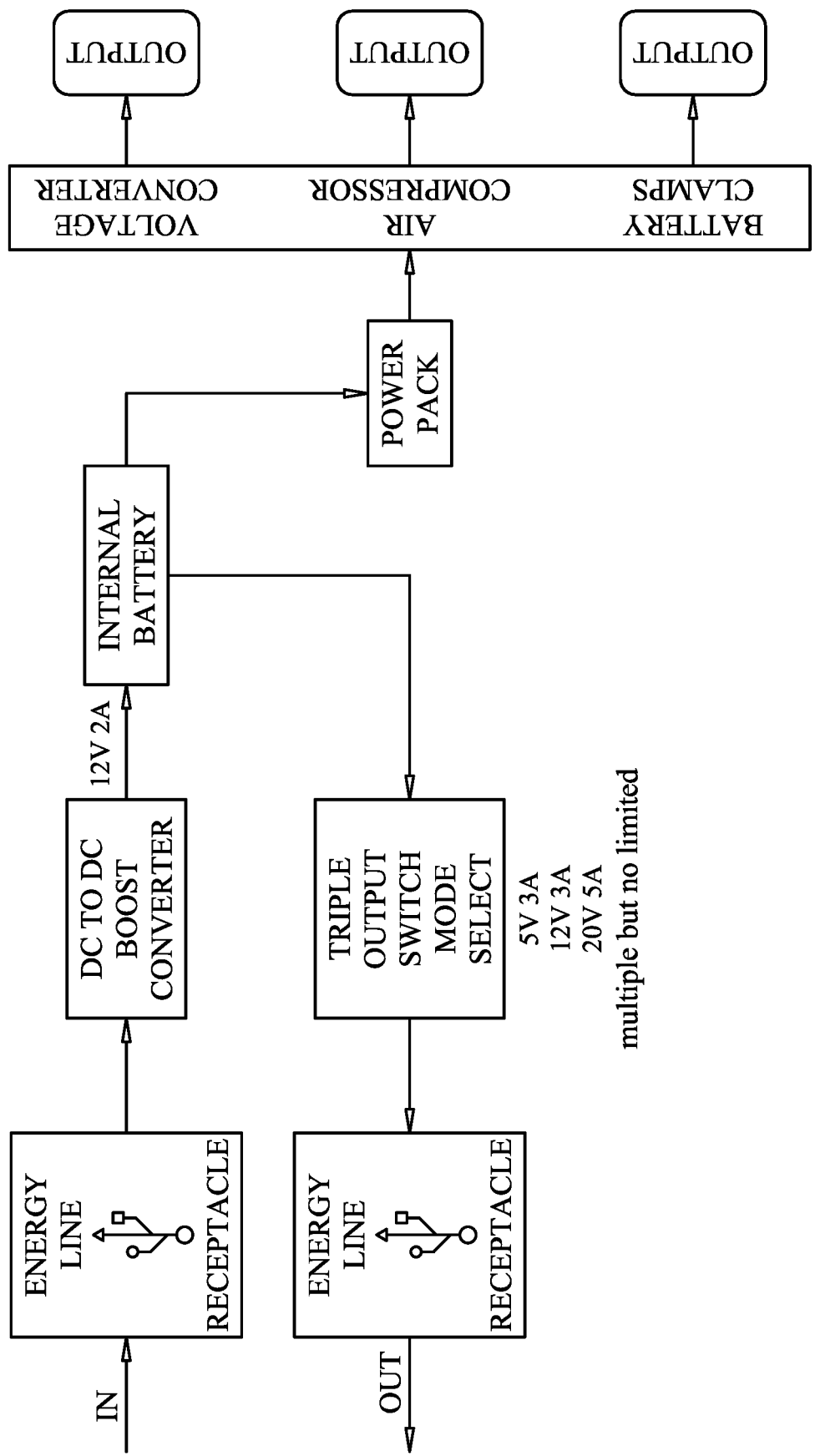

USB RECHARGEABLE CHARGING CIRCUIT FOR PORTABLE POWER PACK WITH BOOST POWER AND PLURALITY OUTPUT SWITCH MODE SELECT OPTION

This application claims the benefit of and priority to U.S. Application Ser. No. 62/978,568, filed Feb. 19, 2020, which application is incorporated by reference in its entirety for all purposes.

1. Field of the Disclosure

The disclosure relates generally to battery jump starters and particularly to improvements in charging sealed lead acid ("SLA") battery jump starters.

2. Background

Nowadays, many devices depend on USB output to power and recharge their internal battery and portable electronics. However, sealed lead acid ("SLA") batteries are not known for being charged via a Universal Serial Bus ("USB"). Traditional USB circuits provide power and data lines to communicate to coupling devices, with a single voltage and current. In the past, a user needed to connect power packs and jump start systems to their home electrical outlet or cigarette lighter socket to recharge these systems. The disclosed novel device overcomes these limitations with prior charging devices.

SUMMARY OF THE DISCLOSURE

Disclosed generally is a sealed lead acid (SLA) battery jump starter that charges via a USB. In addition, a power-out feature can be added to the USB port, which can provide for a 2-way (power in and power out) USB, with the output preferably having a 'triple voltage select' feature. The novel disclosed triple voltage select feature can allow for an output of either 5V, 12V or 20V, though such values are not considered limiting and other voltage values can be used and are considered within the scope of the disclosure. Also, having a triple select is also not considered limited, and other selects (e.g. double select, four select, etc.) can be chosen and also considered within the scope of the disclosure. To charge the jumper's internal SLA battery, the USB input can be a 5V USB charging system with a boost converter.

The disclosed rechargeable power pack can comprise several features, with most features directed to providing temporary emergency power in case of an emergency such as a power outage, dead vehicle electrical system, and/or recharging a low battery for an electronic device.

Additional non-limiting features can include providing power to recharge small consumer electronic devices such as, without limitation, cell phones, iPad, tablets, note pads and others.

The disclosed device provides for higher power, a versatile design, and higher efficiency by integrating a USB charging circuit to recharge a lead acid battery in conjunction with drawing power from the lead acid battery to provide a preferred triple output switch mode selectable power. The disclosed device provides for a USB rechargeable charging circuit that can be capable of providing INPUT low power to recharge lead acid batteries and also provide POWER OUT (preferably) TRIPLE VOLTAGE AND CURRENT to recharge high output electronics.

The USB charging INPUT can be preferably compatible to charge large lead acid batteries as large as a full vehicle battery and as small as a lawnmower type of battery. The POWER OUT can recharge high output electronics using the disclosed (preferably) triple output switch mode select option. One non-example of a high output electronic that can be charged with the POWER OUT capabilities of the disclosed device is a laptop demanding 20V and 5A of power to recharge.

The disclosed novel device facilitates the user with additional options not provided in conventional portable power packs, such as, without limitation, charging from a 5V USB system and be able to recharge via USB at a higher rate.

One or more of the above described components can be provided within a housing.

BRIEF DESCRIPTION OF THE DRAWINGS

FIG. 1 is a non-limiting electrical block diagram/schematic embodiment for a USB rechargeable circuit having a plurality output switch mode select option in accordance with the present disclosure.

DETAILED DESCRIPTION

A USB rechargeable charging circuit for portable power packs with boost power and having a plurality (preferably three) output switch mode select option is disclosed. Preferably, a 5V USB charging system to recharge a power pack can be integrated in conjunction with a preferred triple output switch mode select option/output. Some non-limiting benefits provided by the novel device include:

1. A 5V USB charging system capable of recharging a power pack from any conventional USB receptacle, from the home, office, business, car, on the go, etc.

2. A USB charging system with a multiple high-power capability via USB and preferably, though non-limiting, a triple voltage and current output capability.

3. Can be changed to adapt to market acceptable receptacles and allowing the USB receptacle to provide a high energy recharging option for faster and shorter recharging times.

4. A preferred 5V USB charging system with a boost converter to provide higher energy levels when recharging is needed.

5. A relatively high output converter circuit.

5. All can be built within the same USB.

Integrating a versatile USB charging circuit to a power pack as disclosed herein can expand and improve on recharging batteries and internal batteries dependent on USB output for powering and/or recharging.

Preferably, the USB IN can be integrated to recharge the internal lead acid battery of a jumper and an expansion card can be added with a preferably triple voltage select switch for an USB OUT. In one non-limiting embodiment, the USB IN can recharge a lead acid battery such as at a low rate of 12V, and the USB OUT can be triple voltage selectable 5V, 12V, 20V with its corresponding current, with the USB IN and USB OUT features preferably all integrated in the same system. With the disclosed novel device, a sealed lead acid battery for a jumper can be charged via a USB.

In one embodiment, a micro USB input port can be used, while in another embodiment a two-way USB port (such as those previously patented by the Inventor and incorporated by reference herein in their entirety) can be used. A voltage booster inside the jumper can be provided to allow the 5V 2A USB port of the adapter or any other 2A USB adapter (e.g. iPad) to up convert to 12V and have enough power to fully charge the 12V battery. This "up" converting allows for converting the inputted 5V up to 12V. The preferred 12V value is preferred and not considered limiting and other voltage values can be used and selected and are considered within the scope of the disclosure.

It is also within the scope of the disclosure to incorporate or integrate USB-C technology to allow for more power to be used, which can allow for increased/faster charging times.

Thus, the disclosed circuit allows recharging large batteries in power packs via a relatively low power USB. The power packs and/with jump start system can be provided with multiple output capabilities via USB. The multiple output capabilities and recharging capabilities through the USB port can be all integrated in a single system.

The disclosed novel device can be used to provide portable power in case of an emergency such as power outage, dead vehicle electrical system battery, etc., while also be able to provide power to recharge small consumer electronic devices such as cell phones, iPad, tablets, note pads, etc.

The disclosed novel device integrates a USB charging circuit that can be used to recharge a relatively large lead acid battery in conjunction with the ability to draw power from the lead acid battery to provide a multiple output switch mode selectable power.

The disclosed device can preferably only use the power lines of an USB circuit to recharge large batteries and can integrate a high efficiency circuit greater than ninety percent to recharge power packs and jump start systems with large batteries. The preferred USB charging INPUT can be compatible to charge large lead acid batteries preferably as large as a full vehicle battery and as small as a lawnmower type of battery in one non-limiting example. The disclosed device expands the options to recharge from any USB outlet.

The high POWER OUT can have power capabilities up to 100 Watt of Power, in one non-limiting embodiment, preferably via the internal battery of the power packs and jump start system. The disclosed device provides the user with additional power options not provided in conventional portable power packs, including without limitation the ability to charge from a 5V USB system and be able to recharge via USB at a higher rate. The disclosed novel device can preferably integrate a 5V USB charging system to recharge a power pack in conjunction with a multiple output switch mode select output. Thus, the disclosed device integrates versatile USB charging to a power pack and allows for multiple power outputs to power various devices from the same power pack.

With respect to FIG. 1, the POWER IN/Energy Line in connection with the DC to DC Boost Converter can be considered the charging circuit for the novel disclosed device. The blocks shown in FIG. 1 to the right of the "Power Pack" block are non-limiting examples of user applications, though such is not considered limiting.

The disclosed novel device can use USB technology to recharge power packs and jump start systems from any USB receptacle and no longer limits the USB circuit to recharge small electronics. With the disclosed device, power packs and jump start systems can be charged via USB, in addition to past methods of using a home electrical outlet or cigarette lighter outlet. Thus, with the disclosed device, USB technology can be used for charging large batteries in the automotive industry, as one non-limiting use. The device can provide for a high efficiency power supply with respect to any energy efficiency requirements and can provide a circuit having high efficiency to compensate for any power loss during the DC to DC conversion. The novel device can also use USB C technology for expanded applications, including, without limitation, portable carry applications.

Though preferably a USB receptacle, the output (OUT) receptacle is not limited to only USB technology can be any other conventional output receptacle, such as any other high output capable receptacle. With respect to an OUT expansion card, the novel device is not specifically limited to triple voltage and can have other amounts of multiple outlets. Thus, various number of multiple expansion cards can be included. Furthermore, with respect to the internal battery, the disclosed circuit can also be used to charge other battery chemistries and is not specifically limited to only lead acid type batteries.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figure, it will be understood by those of ordinary skill in the art that various changes in form and details may be made therein without departing from their spirit and scope.

All components of the device and their locations, electronic communication methods between the system components, wiring, attachment or securement mechanisms, mechanical connections, electrical connections, dimensions, values, materials, charging methods, battery types, applications/uses, tools and devices that can be used therewith, etc. discussed above or shown in the drawing, if any, are merely by way of example and are not considered limiting and other component(s) and their locations, electronic communication methods, wiring, attachment or securement mechanisms, mechanical connections, electrical connections, dimensions, values, materials, charging methods, battery types, applications/uses, tools and devices that can be used therewith, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the claims.

While the novel device has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A sealed lead acid ("SLA") battery jump starter comprising:
   a SLA battery;
   a charging system having a DC to DC boost converter in electrical communication with the SLA battery;
   an output voltage selection component having a switch for choosing one from a plurality of output voltage choices; the output voltage selection component in electrical communication with the SLA battery; and a single two-way USB port in electrical communication with both the charging system and the output voltage selection component;

wherein the single two-way USB port allowing power from an electrically connected external power source to recharge the SLA battery through the charging system where an external power source is electrically connected to the two-way USB port and, based on a selected output voltage chosen by a user using the switch, allowing power from the SLA battery to power or recharge an external electronic device when the external electronic device is electrically connected to the two-way USB port;

wherein the output voltage selection component including an expansion card having a triple output voltage select switch.

2. The SLA battery jump starter of claim 1 wherein the plurality of output voltage choices are three output voltage choices.

3. The SLA battery jump starter of claim 2 wherein the three output voltage choices are 5V, 12V and 20V.

4. The SLA battery jump starter of claim 1 further comprising a housing; wherein the SLA battery, charging system and output voltage selection component disposed within the housing and the two-way USB port and switch are externally accessible with respect to the housing.

5. The SLA battery jump starter of claim 1 wherein the charging system is a 5V charging system.

6. The SLA battery jump starter of claim 1 wherein the external electronic devices electrically secured to the SLA battery through the two-way USB port are chargeable at a higher output voltage rate as compared to an input voltage rate for recharging the SLA battery through the two-way USB port.

7. The SLA battery jump starter of claim 1 wherein the charging system including circuitry for converting an input voltage of 5V up to at least 12V.

8. A sealed lead acid ("SLA") battery jump starter comprising:
   a SLA battery;
   a charging system having a DC to DC boost converter in electrical communication with the SLA battery;
   an output voltage selection component having a switch for choosing one from three output voltage choices; the output voltage selection component in electrical communication with the SLA battery; and
   a single two-way USB port in electrical communication with both the charging system and the output voltage selection component;
   a housing, the SLA battery, charging system and output voltage selection component disposed within the housing and the two-way USB port and switch are externally accessible with respect to the housing;
   wherein the single two-way USB port allowing power from an electrically connected external power source to recharge the SLA battery through the charging system where an external power source is electrically connected to the two-way USB port and, based on a selected output voltage chosen by a user using the switch, allowing power from the SLA battery to power or recharge an external electronic device when the external electronic device is electrically connected to the two-way USB port;
   wherein the output voltage selection component including an expansion card having a triple output voltage select switch.

9. The SLA battery jump starter of claim 8 wherein the charging system is a 5V charging system.

10. The SLA battery jump starter of claim 8 wherein the external electronic devices electrically secured to the SLA battery through the two-way USB port are chargeable at a higher output voltage rate as compared to an input voltage rate for recharging the SLA battery through the two-way USB port.

11. The SLA battery jump starter of claim 8 wherein the three output voltage choices are 5V, 12V and 20V.

12. The SLA battery jump starter of claim 8 wherein the charging system including circuitry for converting an input voltage of 5V up to at least 12V.

13. A sealed lead acid ("SLA") battery jump starter comprising:
   a SLA battery;
   a 5V charging system having a DC to DC boost converter in electrical communication with the SLA battery, the charging system including circuitry for converting an input voltage of 5V up to at least 12V;
   an output voltage selection component having an expansion card with a triple output voltage select switch for choosing one from three output voltage choices; the output voltage selection component in electrical communication with the SLA battery; and
   a single two-way USB port in electrical communication with both the charging system and the output voltage selection component;
   a housing, the SLA battery, charging system and output voltage selection component disposed within the housing and the two-way USB port and switch are externally accessible with respect to the housing;
   wherein the single two-way USB port allowing power from an electrically connected external power source to recharge the SLA battery through the charging system where an external power source is electrically connected to the two-way USB port and, based on a selected output voltage chosen by a user using the switch, allowing power from the SLA battery to power or recharge an external electronic device when the external electronic device is electrically connected to the two-way USB port.

14. The SLA battery jump starter of claim 13 wherein the three output voltage choices are 5V, 12V and 20V.

15. The SLA battery jump starter of claim 13 wherein the external electronic devices electrically secured to the SLA battery through the two-way USB port are chargeable at a higher output voltage rate as compared to an input voltage rate for recharging the SLA battery through the two-way USB port.

* * * * *